(12) United States Patent
Hanna

(10) Patent No.: US 8,820,123 B2
(45) Date of Patent: Sep. 2, 2014

(54) APPARATUS AND METHOD FOR COOLING MOLTEN GLASS AND FIBERS

(75) Inventor: Terry Joe Hanna, Millensport, OH (US)

(73) Assignee: Johns Manville, Denver, CO (US)

( * ) Notice: Subject to any disclaimer, the term of this patent is extended or adjusted under 35 U.S.C. 154(b) by 1183 days.

(21) Appl. No.: 11/546,767

(22) Filed: Oct. 12, 2006

(65) Prior Publication Data

US 2008/0184743 A1    Aug. 7, 2008

(51) Int. Cl.
*C03B 37/083* (2006.01)
*C03B 37/02* (2006.01)

(52) U.S. Cl.
CPC .......... *C03B 37/0209* (2013.01); *C03B 37/0213* (2013.01); *C03B 37/083* (2013.01)
USPC .............................................. 65/498; 65/481

(58) Field of Classification Search
USPC .................................... 65/481, 498
See application file for complete search history.

(56) References Cited

U.S. PATENT DOCUMENTS

| | | | |
|---|---|---|---|
| 3,628,930 A | 12/1971 | Harris | |
| 3,867,118 A | 2/1975 | Russell | |
| 3,997,309 A | 12/1976 | Harris | |
| 4,078,413 A | 3/1978 | McCormick et al. | |
| 4,207,086 A | 6/1980 | Heitmann et al. | |
| 4,329,163 A | 5/1982 | Russell | |
| 4,330,311 A | 5/1982 | Jensen | |
| 4,337,075 A | 6/1982 | Mechel et al. | |
| 4,397,665 A | 8/1983 | Harris | |
| 4,566,890 A | 1/1986 | Hostler et al. | |
| 4,824,457 A | 4/1989 | Jensen | |
| 5,244,483 A | 9/1993 | Brosch et al. | |
| 5,693,118 A | 12/1997 | Snedden et al. | |
| 5,749,933 A | 5/1998 | Ghorpade et al. | |
| 5,846,285 A | 12/1998 | Srinivasan et al. | |
| 5,979,192 A | 11/1999 | Srinivasan | |
| 6,192,714 B1 | 2/2001 | Dowlati et al. | |
| 6,196,029 B1 | 3/2001 | Melia et al. | |
| 6,453,702 B1 | 9/2002 | Hanna et al. | |
| 2005/0241342 A1* | 11/2005 | Hanna et al. | 65/493 |
| 2008/0053156 A1 | 3/2008 | Streicher et al. | |

OTHER PUBLICATIONS

Net Composite, "Glass Fiber", Jan. 5, 2002, http://netcomposites.com/education.asp?sequence=33.*

* cited by examiner

*Primary Examiner* — Matthew Daniels
*Assistant Examiner* — Cynthia Szewczyk
(74) *Attorney, Agent, or Firm* — Robert D. Touslee

(57) ABSTRACT

Fiberizing bushing assemblies, usually of rectangular shape, for fiberizing molten inorganic material like glass require cooling members located in the proximity of the orifices or tips forming the fibers. Cooling tubes carrying a cooling fluid like water are used by some fiber manufacturers and the cooling tubes have always been oriented with the length dimension of the bushing. It has now been discovered that orienting the cooling tubes to be substantially parallel to the width dimension, though more costly to fabricate because of the greater number required per bushing assembly, significantly reduce fiber break out rate and significantly increase productivity because they are easier to keep properly adjusted and result in a more uniform temperature of the fiberizing tips.

29 Claims, 3 Drawing Sheets

APPARATUS AND METHOD FOR COOLING MOLTEN GLASS AND FIBERS

The invention involves an improved method and apparatus for making fiber from molten materials including molten glass. More particularly, the present invention involves methods for making fiber that provide a more uniform temperature profile across the orifice/tip plate of the bushings and across the array of molten glass cones and fibers close to the tip plate.

BACKGROUND

In the manufacture of fiber from molten material, it has been common practice to use electrically heated bushings made of precious metals including platinum, rhodium, palladium, ruthenium, iridium and alloys thereof. The bushings are electrically heated by their own resistance and are usually box-like, open on the top and comprise an orifice plate containing hundreds or thousands of orifices, with or without nozzles or tips welded or formed thereon, as shown by U.S. Pat. Nos. 4,207,086 and 4,078,413, which disclosures are hereby incorporated by reference.

As the molten material emerges from the orifices or tips, a meniscus or cone of molten material is formed below each orifice or tip from which a fiber is pulled continuously. This is the objective and to achieve good fiberizing efficiency and productivity, it is essential to uniformly remove a lot of heat from the ends of the tips, the cones of molten glass and the fibers close to the tip plate. What happens in the first half inch or so below the ends of the tips is very critical and if not right one or more fibers will break, requiring a costly stoppage of desired fiberization from that bushing and a beading down and restart to achieve the desired fiberization. By desired fiberization is meant that the bushing is operating making the desired fiber for the product being produced. To remove the heat from the meniscus and fiber that must be removed to cool the molten or plastic fiber so that it will have integrity and strength to endure the remainder of the process of making the fiber product, cooling members are located close to the orifices or nozzle tips. These cooling members can be either cooling tubes like shown in U.S. Pat. Nos. 3,628,930, 4,397,665, 5,244,483 and 6,196,029, the disclosures of which are hereby incorporated by reference, or cooling fins, sometimes called fin blades or fin shields, attached to a cooling manifold as are well known in the fiber industry.

Occasionally, and sometimes frequently, a fiber will break beneath the bushing for various reasons that are known. If the quality of the molten material is satisfactory for fiberization, most of the fiber breaks are caused by one or more tips on the bushing plate being hotter, but usually colder, than desired for good fiberization. A cold tip makes a smaller diameter fiber due to a lower flow rate of molten material through the cold tip. This lower flow rate causes the meniscus and initial fiber to undergo a greater attenuation rate and the greater attenuation rate, of the colder material creates more stress in the attenuation zone. The finer fiber in the attenuation zone also results in faster cooling in the attenuation zone that adds to the stress. When the stress reaches a critical level, the fiber breaks. If the tip is too hot, the viscosity becomes too low to resist the surface tension force of the material and the fiber breaks.

When a fiber break occurs, the loose fiber soon causes other fibers to break and soon all, or most, fibers being formed beneath the bushing are broken, a stoppage of desired fiberization. This is called a "breakout" in the industry. After a breakout begins, it is necessary to wait a short time, usually tens of seconds up to a few minutes, for beads of molten glass to form beneath each bushing orifice or tip, and become large enough that they break loose and fall from the bottom of the orifice plate or tip pulling a very coarse fiber, called a primary fiber, onto the floor, into a scrap bin, basement or scrap bin beneath the forming room floor. This is normally called "beading out" in the industry and the "beading out" typically takes about 30-120 seconds. Once beaded out, or as soon as the operator is available, the operator or starting equipment can then restart a strand containing the primary fibers into a chopper or winder and again begin making the desired product.

When the bushing is running good product the fibers are moving away from the bottom of the bushing at a speed of thousands of feet per minute. This downward movement at this speed, of an array of hundreds or thousands of fibers, creates, due to friction between the air surrounding the fibers and the surface of the fibers, a partial vacuum (lower pressure zone) by pulling a stream of air downward. The partial vacuum causes a flow of cooling air from the surroundings into the array close to the orifice plate and tips of the bushing. This flow of inspirated air coming from outside the array of fibers cools the tips, meniscuses and the newly formed fibers somewhat. Additional cooling is accomplished with the cooling members, cooling fins or cooling tubes, mounted beneath the bushing and close to the tips to cool the air tips and glass/fibers. The cooling of the bushing, tips and orifice plate, causes additional electrical power to be applied to the bushing automatically to maintain the set-point temperature.

When the bushing breaks out, this inspirated cooling flow of cooling air stops. At that time several more undesirable things begin. The set point thermocouple begins to heat up because of the loss of cooling air and as it does, the controller decreases the electrical power heating the bushing. As the electrical power is decreased during the beading out and hanging periods, the molten glass through-put decreases by 5-15 percent, slowing the flow of molten glass through the well, orifice, between the forehearth leg above the bushing and the bushing causing the temperature of the molten glass in the well, and thus the molten glass entering the bushing, to drop substantially, about 25-75 degrees F. This colder glass coming into the bushing causes the molten glass exiting the orifices to be colder and thus to have a higher viscosity. The higher viscosity glass has more resistance to attenuation when desired fiberization is restarted, causing higher stress in the fiber at its weakest point, and it frequently breaks. This is why the break rate is normally highest during the first ten minutes or longer after restart of desired fiberization, particularly as the area of the orifice/tip plate of the bushings has increased to accommodate mote orifices/tips. The larger the area of the orifice plate or tip plate, the greater the tendency to have a larger temperature variance across the orifice plate or tip plate or the tips. It normally takes about ten minutes or longer for the molten glass in, and exiting, the bushing to again reach the desired fiberizing temperature.

The above conditions apply to any molten material, but are most costly in the manufacture of so-called "continuous" glass fiber products from molten glass. In the manufacture of continuous glass fibers, melting furnaces are typically used to melt batch, refine the molten glass, and to feed molten glass through one or more forehearths and usually a plurality of bushing legs to the bushings. It is extremely important, to achieve a very low bushing breakout rate, that the molten glass coming to the bushings is fully melted and uniform in temperature and chemistry. Mixing in the molten glass is mainly dependent upon maintaining desired temperature gradients and flow patterns in the melting furnace. There are typically hundreds of thousands of pounds of molten glass, often about 500,000 pounds, in a typical melting furnace system for making continuous glass fibers. With this much molten material, the melting furnace and delivery system has great momentum and inertia, i.e. it is difficult and takes considerable time correct a change in the molten glass reaching the bushings following a furnace upset. A furnace upset is anything that makes a significant change in the way the melting furnace is operating, including a significant change in the throughput of molten glass through the delivery system, including the bushings. In the past it has been noticed that when a plurality of bushings were stopped from making desired fiber product and put into a hanging mode, to permit a chopper that had been pulling strands of fibers from the bushings to be rebuilt, that after a few minutes the conditions inside the melting furnace would change and that the automatic burner controls for the melter were changing conditions of the burners responding to the change(s) in the furnace. This happens on a smaller scale with every bushing breakout. This is necessary, but not desirable. Although improvements in melting furnace control and stability have been made through the decades that large melting furnaces have existed, frequent furnace upsets or disturbances still exist result in lower productivity and higher manufacturing costs.

There is much debate in the industry whether cooling tubes, usually having at least one fin, or cooling fins, attached at one or both ends to a cooling manifold, are best for making glass fibers. Most of the industry using cooling fins, but at least two fiber manufacturers use finned cooling tubes to manufacture a substantial amount of continuous glass fiber products. Cooling tubes are always mounted to run along the length of the bushing while the cooling fins run across the width of the bushing. As the width of the bushing has grown larger and larger, those using fins have begun using two sets of fins, each set reaching almost one-half the width of the tip plate and each set mounted at one end to a cooling manifold. Temperature gradients of up to several hundred degrees F., up to 800 degrees F. can exist between the upper edge of a fin blade furthest away from the cooling manifold and the temperature of the fin blade where it attaches to the cooling manifold whereas with fins on cooling tubes the top of the fin is almost the same temperature across the length of the fin because the top of the fin is very close to the top of the cooling tube carrying cooling water, usually less than about 6 mm and typically less than about 4 mm. The heat transfer through solid fins is governed by the relationship of thermal conductivity of the fin material times the cross sectional area of the fin times the delta temperature in the fin and divided by the distance of the heat transfer in the fin. As bushings became larger, and throughput higher, to produce more fibers per position and more pounds of fiber per hour per position, this relationship results in less uniformity wile the need is more uniformity in cooling by the cooling members and this uniformity becomes more critical to low breakout rates. Also, cooling tubes are more efficient heat removers per unit of surface area than cooling fins alone making cooling tubes with or without fins easier to accommodate beneath the tip plate without interfering with the fiber paths or bead drop.

There has not been much change in cooling tubes over the decades, except for the material used to make the tubes and fins, but there have been many proposed changes in the design and mode of function of the cooling fins. In U.S. Pat. No. 3,867,118, one set of fins mounted on a coolant cooled manifold extended entirely across the width of the bushing and for a substantial distance on beyond each edge of the bushing. In U.S. Pat. No. 4,330,311, much longer cooling fins connected on each end to a coolant manifold were disclosed. U.S. Pat. No. 4,566,890 and patents mentioned therein disclose methods of retarding or removing deposits of oxides that form on cooling fins causing changes in the heat absorption rate. U.S. Pat. No. 4,824,457 discloses the use of hollow cooling fins in which a coolant fluid is circulated across the fin to the end of the fin and then returned to the coolant manifold in a lower passage the same fin.

SUMMARY

It has been surprisingly discovered that by changing the orientation of the rows of tips or orifices and the cooling tubes from substantially parallel to a first, longest, dimension of the tip plate or orifice plate to substantially parallel to the second, shortest, dimension, usually the width i.e. the shortest dimension of the plate surface containing tips and/or orifices, the cooling effectiveness, capacity and uniformity, of the plurality of cooling tubes is significantly improved. In the past, cooling tubes have always been oriented parallel to the longest dimension of the tip plate or orifice plate. According to the invention, the shortest dimension is at least about 4 inches. Running the tubes parallel to the shortest dimension had not been given serious consideration because more tubes would be required which would result in higher fabricating costs per bushing assembly and no offsetting benefit was expected. To learn, with the present invention, that this latter belief was wrong was extremely surprising. It has also been discovered that when this type of tip cooling is used on a bushing, the coefficient of variation of diameter of the fibers made by that bushing is substantially reduced.

From the above discoveries, it is believed that if the throughput on at least many of the bushings on a melting furnace system, including a plurality of bushings and a melting furnace supplying molten material to the bushings, is maintained substantially constant, the stability of the melting furnace will be substantially improved and the fiberizing quality of the molten material flowing into the bushings will be substantially improved. By many of the bushings is meant at least about 25 percent of the operating bushings in the system. When most of the bushings are operated according to the invention, the melting furnace will operate at substantially constant throughput. By most of the bushings is meant at least about 65 percent of the operating bushings in the system. When substantially all of the bushings are operated according to the invention, the throughput of the melting furnace will not vary by more than 1-2 percent, except for power failures or other external interruptions. By substantially all of the bushings is meant at least about 90 percent of the operating bushings in the system.

According to the invention, the uniformity of cooling of the tip plate or orifice plate, tips and cones of molten glass adjacent the orifices or tips is substantially improved by the present invention, and the amount of cooling of the tip or orifice plate, etc. is also improved. Hereafter, the cooling of the tip plate or orifice plate, tips and cones of molten glass adjacent the orifices or tips will be referred to simply as "tip cooling." This improved tip cooling produced by the invention also produces other favorable including one or more of reduced break rate (break(s) per hour per fiberizing bushing), higher throughput, higher productivity and easier and faster cooling tube adjustment when needed.

The invention comprises a bushing assembly for converting a molten material into a plurality of fibers comprising a tip plate or an orifice plate having a plurality of tips or holes therein, the tip plate or orifice plate being longer in a first dimension than in a second dimension that is perpendicular to the first dimension, both first and second dimensions lying in the same plane, at least one sidewall and a tip cooling assembly comprising a plurality of hollow cooling tubes mounted beneath the tip plate or orifice plate, each of the plurality of cooling tubes being hollow to carry a flow of cooling fluid therethrough, the improvement comprising that each of the plurality of cooling tubes are oriented to be substantially parallel to the second dimension. By tips are meant the conventional meaning of the term in the fiberizing bushing art, i.e. small tubes or nozzles having a passage therethrough for flowing the molten material through By substantially parallel means that the center line of each of the cooling tubes is within about +/−5 degrees of the direction second dimension. Most typically, the bushing will comprise two sidewalls and two end walls forming a rectangular box open at the top for receiving the molten material. Most typically, when used with a molten inorganic material, the bushing is fabricated from a precious metal or precious metal alloy such as a platinum/rhodium alloy as is well known. Any design of fiberizing bushing that uses cooling members mounted beneath the tip plate or orifice plate is suitable for use in the invention. The length of the orifice plate or tip plate is typically at least about 1.25 times the width dimension, more typically at least 1.5 times the width and most typically is between at least 2 and up to at least 3, including at least about 2.2, times the width.

The invention most typically comprises a fiberizing bushing assembly comprising a bushing having at least two side walls, at least two end walls with one or more electrical ears on each end wall to connect to electric terminals to provide heating power to the bushing, and a tip plate comprising a plurality of rows of spaced apart tips, the tip plate being at least about 190 mm wide and at least about 445 mm long, and cooling tubes having one or more fins thereon for cooling the tips mounted beneath the tip plate such that at least one fin per cooling tube is in a location to remove heat from at least one row of tips, the improvement comprising that the plurality of rows of tips run across the width of the tip plate and one or more cooling tubes having one or more cooling fins thereon is spaced between pair of two adjacent rows of tips, one or more of the fins on each cooling tube located to the side of, but near the ends of the tips in an adjacent row of tips. Alternatively, the bushing tip plate comprises a plurality of paired rows of tips with the tips of a first row of the pair being offset with respect to the tips of the second row of the pair, but the tips of a first row can also be aligned with the tips of the second row. When the tips of the first row are offset with respect to the tips of the second row, the offset should be in the range of about 1.65 mm.

The cooling tubes used with the bushing assembly of the invention can have any of many cross sections as is known including circular, oval or rectangular, with or without radiused corners, but any reasonable cross section shape is suitable. The cooling tubes can have one or more fins extending from the outer surface of the cooling tube to improve cooling capacity, also as is well known. In the bushing of the invention, the rows of tips or orifices are also oriented to be substantially parallel to the second dimension, most typically in a pattern of offsetting double rows spaced apart with room between double rows for a cooling tube.

The invention also includes a process of making fiber from a molten mineral or glass material by flowing the molten material into a fiberizing bushing comprising an orifice plate or tip plate having a length and a width, the length being longer than the width and having a plurality of holes therein, with or without tips, each orifice or tip having an orifice therethrough that communicates through the orifice plate with the molten material or glass in the bushing, applying electrical power to the bushing causing the molten material to flow through the orifices in the orifice plate or in the tips to form fibers, cooling the just formed fibers using a plurality of cooling tubes held in place below and spaced from the orifice plate or tip plate to produce a desired fiberization mode, the improvement comprising mounting the plurality of cooling tubes beneath the orifice plate or tip plate and orienting the plurality of the cooling tubes to be substantially parallel to the width of the tip plate or orifice plate.

By "desired fiberization mode" is meant the condition where fibers are being pulled from a bushing at a speed similar to that produced by a product-forming machine like a chopper or winder, usually at more than 1000 feet per minute and most typically at more than 2000 or 3000 feet per/minute. The cooling tubes, with or without one or more fins, used in the invention are smaller than the fins used in typical fin shield bushings having a tip plate width of at least about 4 inches (at least about 101.6 mm). For example, the hollow cooling tubes used in the invention and shown in FIGS. 6A-6K are typically about 6 or 7 to about 16 mm, or about 5/16 to about 9/16 inch. (about 0.3125 to about 0.5625 inch) tall and about 0.105 to about 0.165 inches (about 2.667 to about 4.191 mm) wide, more typically about 0.125 to about 0.155 inches (about 3.175 to about 3.937 mm) wide. The fin(s) on the cooling tube, when used, is/are about 1/8 to about 7/32 inch (about 3 or about 3.175 to about 5.556 mm, or up to about 6 mm or even Up to about 8 mm tall and less than about 0.115 inches about (2.921 mm) thick. In comparison, the fins of a typical fin-shield cooling system are more than two inches long, about 0.75 to about 1.25 Inches deep and about 0.80 to about 0.125 inches thick.

The invention also includes a fiberizing system for making fibers from molten glass or a molten material, the system comprising a source of molten glass or a molten material, a plurality of fiberizing bushings for making fibers from molten glass or molten material, the bushing comprising at least one sidewall and an orifice plate or tip plate having nozzles or tips protruding from the bottom surface, the orifice plate or tip plate having a length and a width, the length being greater than the width, and cooling tubes mounted beneath the bushing and close to the bottom of the tips for providing cooling for the molten glass or molten material as it exits the tips and a puller for pulling the formed fibers away from the orifices in the orifice plate or the tips, the improvement comprising that each of the plurality of cooling tubes are oriented to be substantially parallel to the width dimension of the orifice plate or the tip plate. The puller can be a fiber strand winder, a fiber strand chopper or a set of pull rolls. The cooling members are hollow tubes of any reasonable cross section, with or with out one or more fins, hollow or solid, connected to a heat sink, for retaining a flow of cooling fluid that can be a gas but more typically is a liquid like water, e.g. recycled and process water.

The cooling members are usually supported by one or more cross members, typically with a cross member outboard of and near each end of the bushing, that are supported with generally vertical members, each generally vertical member being capable of adjusting the distance from the top of the cross member to the bottom of the tips. By generally vertical is meant vertical and up to about 15 degrees from vertical. The cooling members are designed to carry a cooling liquid or other fluid. Air and water are fluids, but other gases and other liquids can be also used. All of the above embodiments of the invention can, and often do, also use one or more conventional air tubes mounted under the bushing for inducing air flows into the region beneath the bushing when the bushing is hanging.

Practice of the invention accomplishes much more than improving the performance of the bushing the invention is being used on. When all or most of the bushings on a melting furnace system are operated in the above manner, i.e. having substantially constant molten material throughput, the stability of the melting furnace, i.e. equilibrium, will be much improved, the quality, uniformity, of the molten glass reaching the bushings will be much improved, and the breakout rate of all the bushings will be substantially reduced. By "many of the bushings" is meant at least 25 percent of the operating bushings on the melting furnace system. The more bushings that are operated according to the invention on a melting furnace system, the more stable the melting furnace will become and the more improvement in break rate and cost. This will substantially increase the product productivity of the melting furnace system and substantially reduce the cost of every pound of fiber product produced according to the invention.

Some of the more important advantages of the invention include:
1. A cooling tube life that is longer than the life of the bushing. Frequently, the life of the fins on a fin-shield system is less than the life of the bushing causing significant down time to replace part or all of the fin-shield coolers.
2. It is easier and thus faster to adjust the cooling tubes of the invention than the conventional longitudinal cooling tubes and also the fin-shield fin coolers.
3. Less productivity damaging tip plate flooding is experienced with the invention than when using fin-shield cooling systems.
4. The invention allows bushing designs that produce hotter tip temperatures and either lower fiber tension or higher fiber productivity per tip.

The present invention is applicable to any system or bushing that converts molten material to continuous fibers and particularly to systems and bushings that operate at temperatures above 1000 degrees F. Materials suitable for converting in the present invention are polymers, metals and mineral materials including glasses, ceramic compounds or mixtures of ceramic materials, slags and the like. The invention is particularly useful in making continuous glass fibers and products made using such fibers. While the invention is applicable to any glass used to make fibers, E glass is the most common glass used to make continuous fiber.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION

Figure 1:
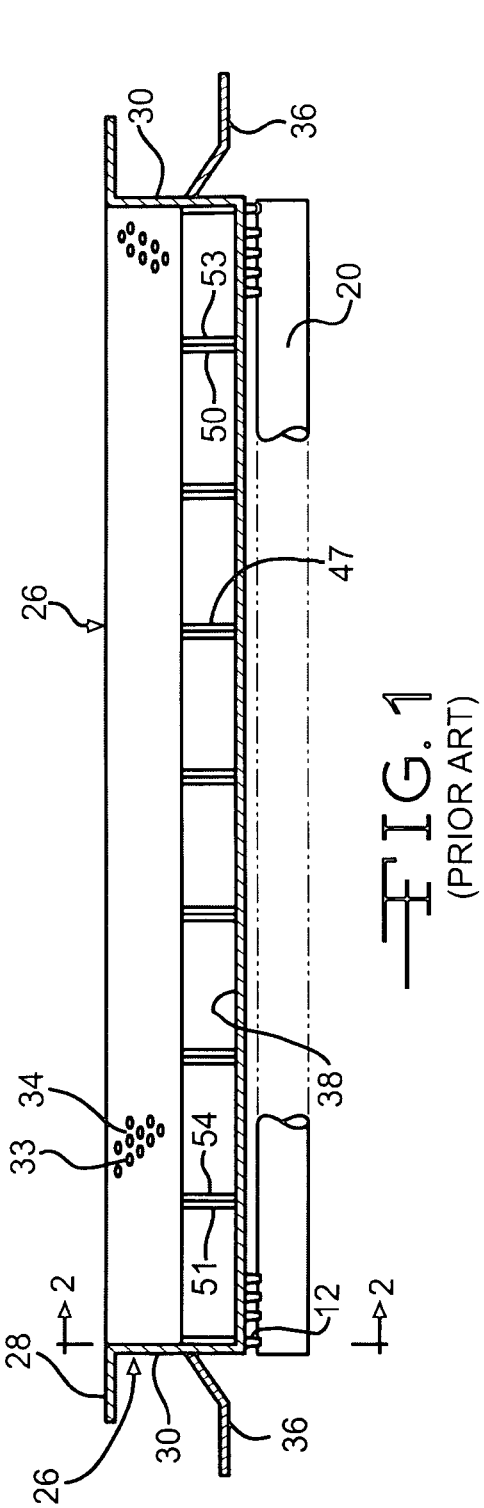
FIG. 1 is a lengthwise cross sectional view of a typical prior art bushing assembly showing cooling members mounted beneath the bushing along lines 1-1 of FIG. 2.

FIG. 1 is a partial lengthwise cross sectional view of a typical prior art precious metal fiberizing bushing assembly 26 including a precious metal alloy bushing 27, cooling tubes 20 used to form glass fiber from molten glass. Most any prior art and future improved bushing can be used in the invention and the prior art bushing 25 is described in detail in U.S. Pat. No. 6,453,702, incorporated herein by reference. This typical prior art bushing 25 is typically made from a platinum/rhodium alloy having a rhodium content ranging from about 10-30 percent, typically 20-25 percent and is encompassed in a conventional mounting frame (not shown) for mounting on the bottom side of a forehearth or leg of a furnace in a conventional manner. Details of a typical bushing mount can be found in U.S. Pat. No. 3,997,309, incorporated herein by reference.

The bushing 25 comprises conventional sidewalls 24, end walls 30 and an electrical terminal ear 36 attached to each end wall 30. The bushing 2 also comprises a tip plate 38 having a plurality of tips, nozzles, 12 welded to or formed from the tip plate 38.

Normally, the tips 12 are arranged in rows down the length of the tip plate 38. In the bushing shown in FIG. 1, the tips 14 are arranged in pairs of rows staggered, running along the length of the bushing in a known manner, e.g. as shown in U.S. Pat. No. 4,337,075. This configuration has been used to make glass fiber since at least the early 1970's.

The tip plate 38 can be replaced with just an orifice plate without tips surrounding orifices in the orifice plate. The bushing 25 is electrically heated by connecting the terminal ears 36 to an electrical input in a conventional manner. The cooling tubes 16, typically have at least one optional fin 18 for enhancing the cooling as each fin 18 can be moved closer to the tips 12 than can the cooling tubes 16. Some cooling tubes 20 optionally have at least two fins 22, extending from the surface of the cooling tubes 20, with a refractory ceramic insert 23 nested between the pairs of fins 22 to support the tip plate, while also cooling the tips 12 in the same manner as fins 18. One end of each cooling tube 16,20 is supplied with a conventional cooling fluid, usually process water, that flows through each cooling tube and exits into a collection pan (not shown) to be recycled after running through a cooling tower. The process water typically rises in temperature less than about 20 degrees, more typically less than about 15 degrees and most typically less than about 10 degrees F. as it passes through each cooling tube 16, 20. The vertical distance between the top surface 27 of the cooling fins 26 and the bottom of the tips 14 is typically in a range of about 0-0.0625 inch. The cooling tubes 16,20 are supported in a known manner, such as disclosed in U.S. Pat. No. 5,244,483, its disclosure herein incorporated by reference. While the cooling tubes 16,20 shown here are oval in cross-section, they can be any reasonable shape such as round, square, rectangular with or without radiused ends, etc. as is known.

The bushing 25 also typically contains a conventional screen 34 having a plurality of holes 33 therein for the purposes of catching any large pieces of refractory in the molten glass, for providing a mixing function and optionally for controlling the flow of molten glass to the tip plate 38 in such a way as to produce a uniform or more uniform glass temperature reaching all of the tips 12. The bushing 25 can also comprise a plurality of conventional internal tip plate supports 50,51,53,54 as is known. In this prior art embodiment, bushing 25, the internal tip plate supports have passages 26 in the bottom portion of each support to avoid interfering with the entrances to the passageways through the tips 12.

Figure 3:
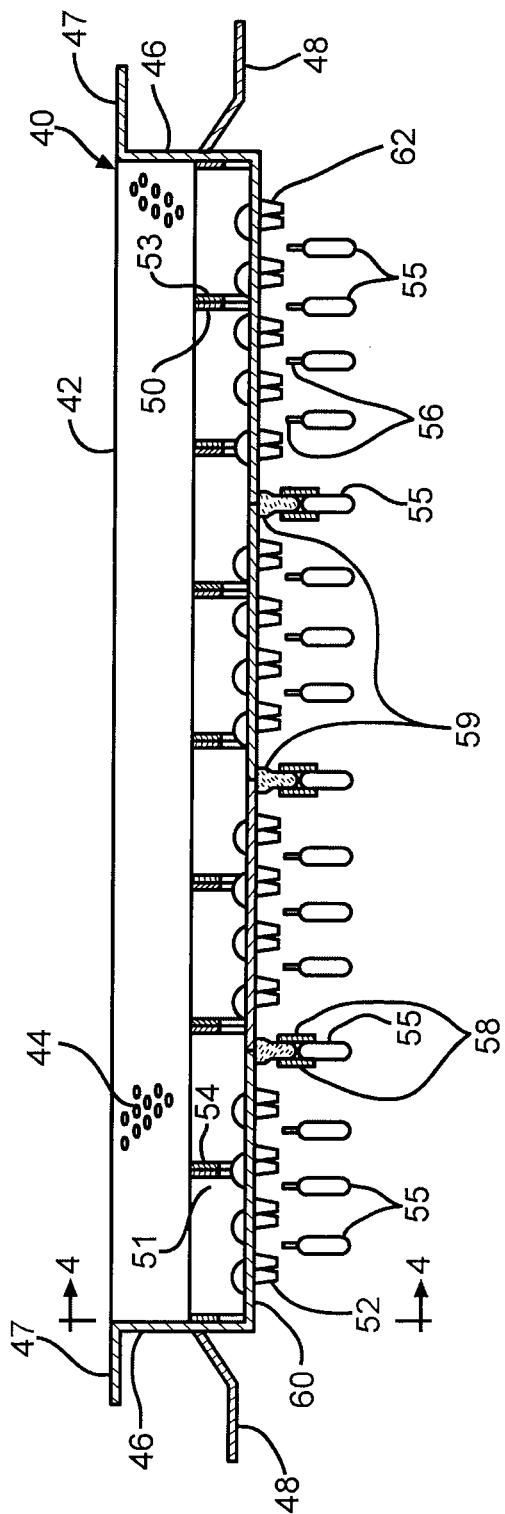
FIG. 3 is a lengthwise cross section view of the prior art bushing assembly shown in FIG. 1 modified according to the invention by orienting and mounting the cooling tubes to be substantially parallel with the width dimension of the tip plate.

FIG. 3 is a partial cross sectional view of an embodiment of the invention comprising the bushing 40 having two sidewalls 42, a screen 44 with a plurality of holes therein, two end walls 46, each having an ear terminal 48 welded thereon and an orifice plate 60 having double rows of nozzles, tips 52 with each double row of tips 52 spaced apart from an adjacent double row of tips 52 to provide room for a cooling tube 55, with or without one or more fins such as single fin 56 and double fins 58. A flange 47 is attached to or integral with the sidewalls 42 and the end walls 46 for the purpose of sealing the bushing 40 to the bottom of a forehearth (not shown) in a conventional manner. The cooling tubes 55 are oriented beneath the tip plate 60 to be parallel with the width dimension and substantially perpendicular to the length dimension of the tip plate 60. The cooling tubes 55 can be supported in any manner including the support systems used in the prior art such as disclosed in U.S. Pat. Nos. 4,397,665 and 5,244,483 and U.S. patent application ser. Nos. 11/320,135 filed Dec. 28, 2005 and 11/369,782 filed Mar. 7, 2006, the disclosures of all of these patents and patent applications being incorporated herein by reference. When the bushing is oval in shape instead of rectangular, the bushing has only one wall with the ear terminals placed opposite each other across the length of the oval, or placed across the width of the oval and in the latter embodiment two or more pairs of terminals are can be used if desired.

Figure 2:
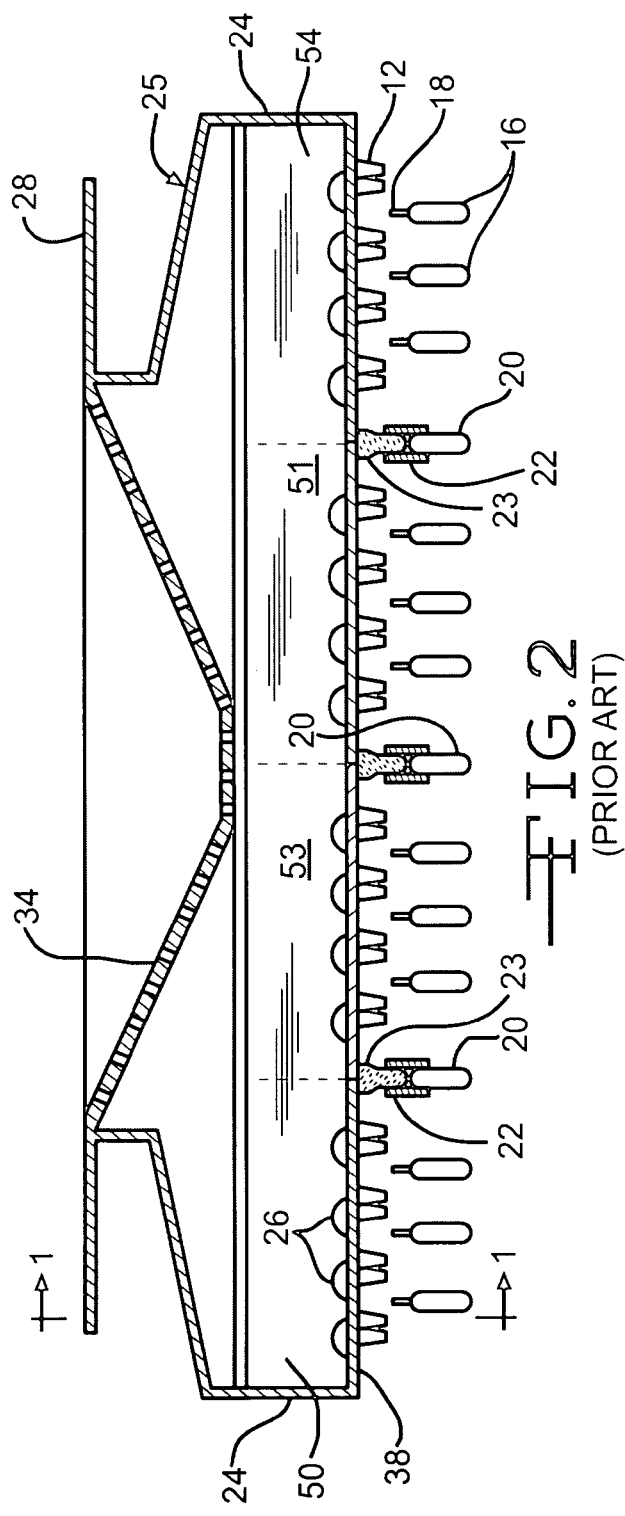
FIG. 2 is a partial cross sectional view of the prior art bushing assembly shown in FIG. 1 along lines 2-2, showing cooling tubes oriented in the conventional orientation for tip cooling.
Figure 4:
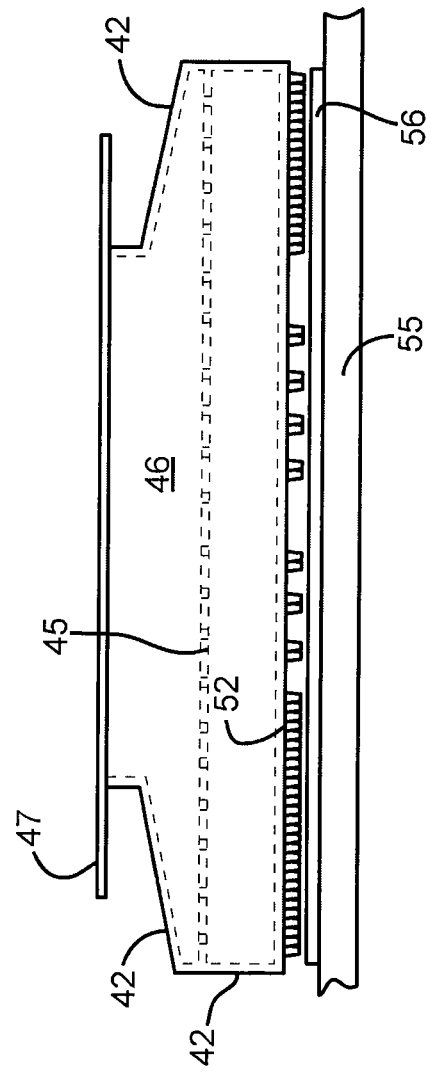
FIG. 4 is a cross sectional view of the embodiment shown in FIG. 3 taken along lines 4-4.
Figure 5:
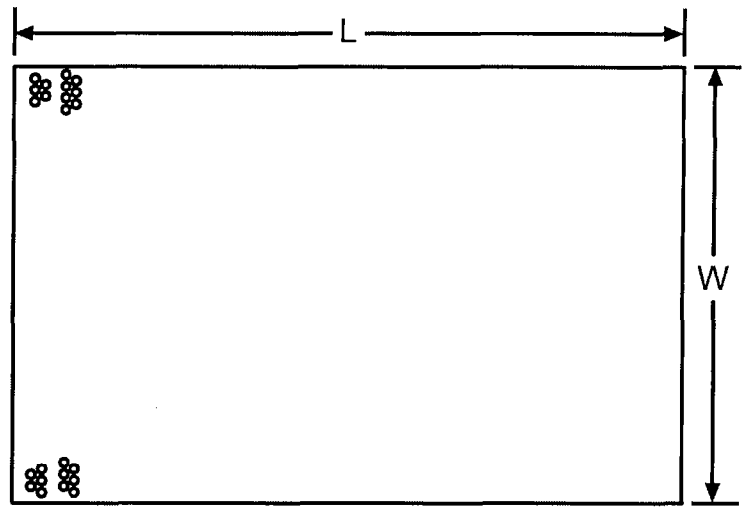
FIG. 5 is a plan view of a typical tip plate taken from the tip side showing the length dimension L to be significantly greater than the width dimension W.
Figure 6A:
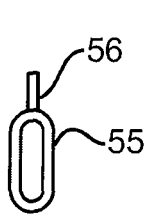
FIGS. 6A-6L show typical cross sections of several of the many cross section shapes suitable for the cooling tubes used in the invention.
Figure 6B:
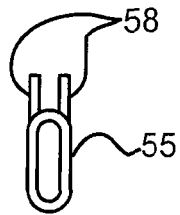
Figure 6C:
Figure 6D:
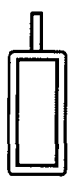
Figure 6E:
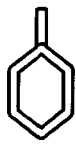
Figure 6F:
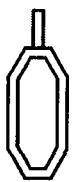
Figure 6G:
Figure 6H:
Figure 6I:
Figure 6J:
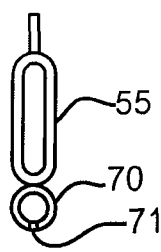
Figure 6K:
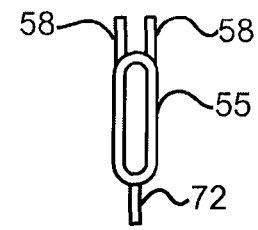
Figure 6L:
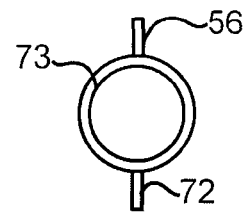

FIG. 4 is a cross section along lines 4-4 of the bushing assembly 40 embodiment shown in FIG. 3 except that a flat screen 45 is shown instead of the screen 44 shown in FIG. 3, the latter being like screen 34 in FIGS. 1 and 2. FIG. 5 is a plan view of the tip plate 60 and relects that the length L is at least 1.25 times the width W.

The hollow cooling tubes 55 can be of most any cross section, but for practical reasons and for efficient and effective cooling certain cross section shapes are normally used. Some of these cross sectional shapes are shown in FIGS. 6A-6L. A conventional air tube 70 having spaced apart orifices 71 to emit compressed air in a conventional manner is attached to the lower surface of the cooling tube 55 shown in FIG. 6J and this air tube 70 can be attached to the lower surface of any cooling tube cross section including those shown in FIGS. 6A-6I, 6K and 6L. A fin 72 is attached to a lower surface of the cooling tube 55 shown in FIG. 6K, and to the lower surface of the circular cooling tube 73 shown in FIG. 6L, to provide additional cooling of the newly formed fiber. Such a fin 72 can be attached to the lower surface of any cooling tube including those shown in FIGS. 6A-6I. When recycled process water is used as the cooling fluid, the inlet temperature is typically in a range of about 80 to about 95degrees F. and the cooling tube exit temperature is typically in a range of about 85 to about 115 degrees F. higher than the entrance temperature, typically about 5-10degrees F. increase at normal flow rates.

A 6,000 tip bushing, operated according to the embodiment shown in FIGS. 3-5 showed a significant decrease in break rate, i.e. breakouts per hour, compared with the same sized conventional bushing having the cooling tubes oriented to be substantially parallel to the length dimension as shown in FIGS. 1 and 2. The shorter cooling tubes used in the invention were easier to keep in proper adjustment when the tip plate sagged with operating time, a normal happening, and resulted in a more uniform temperature of the fiberizing tips during the life of the bushing. While the greater number of cooling tubes required for the bushing assembly of FIGS. 3-4, at least about 48 and typically 51 or more cooling tubes vs 21 cooling tubes required by the bushing assembly of FIGS. 1-2, resulted in higher fabrication cost of the bushing assembly of the invention, this higher cost was offset in a very short time of operation by the lower break rate and higher productivity of the invention, resulting in a substantially more cost effective fiberizing bushing assembly than heretofore experienced. A bushing assembly having approximately 2000 tips according to the present invention would comprise at least about 16 cooling tubes versus 7 or 8 cooling tubes on a conventional bushing assembly, a bushing assembly having 4000 tips according to the invention would have at least about 30-34 cooling tubes versus about 14-16 cooling tubes in a conventional bushing assembly, and bushing assembly having 4400 tips according to the invention would have at least about 38-40 cooling tubes versus about 16-18 for a conventional bushing assembly. The cooling tubes most typically used were rectangular in cross section with radiused corners and had one fin extending from the upper exposed surface of each cooling tube. The dimensions of the cooling tubes was about $7/16$ inch high by about 0.125-0.155 inch and the height of the fin ranged from about $1/8$ inch to about $3/16$ inch. Other advantages of the bushing assemblies of the invention are provided above.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A bushing assembly comprising a bushing comprising an orifice plate or tip plate having a length dimension L, and a width dimension W of at least about 4 inches, the L:W ratio being at least about 1.5, the bushing also comprising at least one wall and at least one pair of terminal ears, the orifice plate or a tip plate having a plurality of spaced apart orifices therethrough from an inside surface to an exposed surface, the bushing assembly also comprising a plurality of spaced apart cooling tubes located in close proximity to the exposed surface for containing a flow of cooling fluid in each cooling tube, the cooling fluid entering one end of each cooling tube and exiting an opposite end of each cooling tube, wherein all of the plurality of spaced apart cooling tubes, numbering 16 or more with each cooling tube having one or more fins extending from a surface of the cooling tube towards the orifice plate or tip plate, are oriented to be substantially parallel with the width dimension of the bushing and with rows of the orifices.

2. The bushing assembly of claim 1 wherein the bushing is rectangular and comprises a tip plate having a plurality of rows of tips, each tip communicating with one of the orifices, two end walls and two side walls, wherein the ratio of tips to cooling tubes is approximately 2000 tips to at least about 16 cooling tubes.

3. The bushing assembly of claim 2 wherein the L:W ratio is at least about 2.

4. The bushing assembly of claim 3 wherein the cooling tubes are oval or long oval in cross section.

5. The bushing assembly of claim 3 wherein the cooling tubes are rectangular in cross section.

6. The bushing assembly of claim 3 wherein the cooling tubes have at least one fin extending no more than about 6 mm from the outer surface of each cooling tube.

7. The bushing assembly of claim 2 wherein the cooling tubes are oval or long oval in cross section.

8. The bushing assembly of claim 2 wherein the cooling tubes are rectangular in cross section.

9. The bushing assembly of claim 2 wherein the cooling tubes have at least one fin extending no more than about 6 mm from the outer surface of each cooling tube.

10. The bushing assembly of claim 1 wherein the bushing comprises a tip plate having a plurality of fiberizing tips and wherein the L:W ratio is at least about 2.

11. The bushing assembly of claim 10 wherein the cooling tubes are oval or long oval in cross section.

12. The bushing assembly of claim 10 wherein the cooling tubes are rectangular in cross section.

13. The bushing assembly of claim 1 wherein the cooling tubes are oval or long oval in cross section.

14. The bushing assembly of claim 13 wherein the cooling tubes have at least one fin extending no more than about 6 mm from the outer surface of each cooling tube.

15. The bushing assembly of claim 1 wherein the cooling tubes are rectangular in cross section.

16. The bushing assembly of claim 15 wherein the cooling tubes have at least one fin extending no more than about 6 mm from the outer surface of each cooling tube.

17. The bushing assembly of claim 1 wherein the cooling tubes have at least one fin extending no more than about 6 mm from the outer surface of each cooling tube.

18. A bushing assembly comprising a bushing comprising a tip plate having a length dimension L, and a width dimension W of at least about 4 inches, the L:W ratio being at least about 2, the bushing also comprising two or more side walls, two or more end walls and at least one pair of terminal ears, the tip plate having a plurality of rows of spaced apart orifices therethrough from an inside surface to an exposed surface, and a plurality of spaced apart tips on the exposed surface of the tip plate, and an axis of each tip aligning with an axis of one of the orifices, the bushing assembly also comprising a plurality of spaced apart cooling tubes located in close proximity to the exposed surface for containing a flow of cooling fluid in each cooling tube, the cooling fluid entering one end of each cooling tube and exiting an opposite end of each cooling tube wherein the plurality of spaced apart cooling tubes are oriented to be substantially parallel with the width dimension of the bushing and with the rows of the tips, at least 16 of the cooling tubes having one or more fins extending from an outer surface of at least some of the cooling tubes and the cross sectional shape of the cooling tubes being rectangular with the height of the cooling tube being in the range of about 6 to about 16 mm, the width being about 3.18 to about 6.48 mm and the fin(s) extending about 3 mm to about 8 mm from the outer surface of the cooling tube(s).

19. The bushing assembly of claim 18 wherein the cross sectional dimensions of the cooling tubes are about 5/16 to about 9/16 inch by about 0.125 to about 0.155 inch and the fin(s) extend from about 3 mm to about 6 mm beyond the outer surface of the cooling tube and wherein the cooling tubes have radiused corners.

20. The bushing assembly of claim 18 wherein the ratio of tips to cooling tubes is approximately 2000 tips to at least about 16 cooling tubes.

21. A method of making fiber from a molten glassy material by flowing the molten glassy material into a bushing in a bushing assembly, the bushing comprising an orifice plate or a tip plate having a length dimension and a width dimension, the length L being at least about 1.5 times the width W, the bushing also comprising at least one wall and at least one pair of terminal ears, the orifice plate or a tip plate having a plurality of spaced apart orifices therethrough from an inside surface to an exposed surface and a plurality of spaced apart cooling tubes located in close proximity to the exposed surface for containing a flow of cooling fluid in each cooling tube, the cooling fluid entering one end of each cooling tube and exiting an opposite end of each cooling tube wherein the plurality of spaced apart cooling tubes, numbering at least 16 with each cooling tube having one or more fins extending from an outer surface of the cooling tube towards the exposed surface of the orifice plate or tip plate and are oriented to be substantially parallel with the dimension W of the orifice plate or tip plate and to the rows of the orifices to form fibers, and pulling the fibers away from the orifice plate or tip plate and past the cooling tubes.

22. The method of claim 21 wherein the glassy material is selected from a group of glass types consisting of E, A, C, R, S, and mixtures of two or more of these types of glass and wherein the ratio of tips to cooling tubes is approximately 2000 tips to at least about 16 cooling tubes.

23. The method of claim 22 wherein the glassy material is E glass.

24. The method of claim 21 wherein the bushing comprises a tip plate having a length dimension L and a width dimension W of at least about 4 inches, the L:W ratio being at least about 2, the bushing also comprising two or more side walls, two or more end walls and at least one pair of terminal ears, the tip plate having a plurality of spaced apart orifices therethrough from an inside surface to an exposed surface, and a plurality of spaced apart tips on the exposed surface of the tip plate, the bushing assembly also comprising a plurality of spaced apart cooling tubes located in close proximity to the exposed surface for containing a flow of cooling fluid in each cooling tube, the cooling fluid entering one end of each cooling tube and exiting an opposite end of each cooling tube, the plurality of spaced apart cooling tubes, numbering at least 16, are oriented to be substantially parallel with the width dimension of the bushing and to rows of the tips, the cooling tubes having one or more fins extending from an outer surface of the cooling tubes and the cross sectional shape of the cooling tubes being rectangular, with radiused corners, with the height of the cooling tube being in the range of about 7 to about 16 mm, the width being about 3.18 to about 6.48 mm and the fin(s) extending about 3 mm to about 8 mm from the outer surface of the cooling tube(s).

25. The method of claim 21 wherein the cross sectional dimensions of the cooling tubes are about 5/16 to about 9/16 inch by about 0.125 to about 0.155 inch and the fin(s) extend from about 3 mm to about 6 mm beyond the outer surface of the cooling tube and wherein the ratio of tips to cooling tubes is approximately 2000 tips to at least about 16 cooling tubes.

26. The method of claim 25 wherein the height dimension of the cooling tube cross section is about 7/16 inch.

27. A bushing assembly comprising a bushing comprising an orifice plate or tip plate having a length dimension L, and a width dimension W of at least about 4 inches, the L:W ratio being at least about 2, the bushing also comprising at least one wall and at least one pair of terminal ears, a tip plate having a plurality of spaced apart tips, the tips having orifices therethrough from an inside surface of the tip plate to exposed ends of the tips, the bushing assembly also comprising a plurality of spaced apart cooling tubes located in close proximity to the exposed ends of the tips for containing a flow of cooling fluid in each cooling tube, the cooling fluid entering one end of each cooling tube and exiting an opposite end of each cooling tube, wherein the plurality of spaced apart cooling tubes are oriented to be substantially parallel with the width dimension of the tip plate and the bushing and with rows of the tips and wherein the total number of tips on the tip plate is about 4000 and the plurality of cooling tubes number at least about 30 with each cooling tube having one or more fins extending from an outer surface of the cooling tube.

28. A bushing assembly comprising a bushing comprising an orifice plate or tip plate having a length dimension L, and a width dimension W of at least about 4 inches, the L:W ratio being at least about 2, the bushing also comprising at least one wall and at least one pair of terminal ears, a tip plate having a plurality of spaced apart tips, the tips having orifices therethrough from an inside surface of the tip plate to exposed ends of the tips, the bushing assembly also comprising a plurality of spaced apart cooling tubes located in close proximity to the exposed ends of the tips for containing a flow of cooling fluid in each cooling tube, the cooling fluid entering one end of each cooling tube and exiting an opposite end of each cooling tube, wherein the plurality of spaced apart cooling tubes are oriented to be substantially parallel with the width dimension of the tip plate and the bushing and with rows of the tips and wherein the total number of tips on the tip plate is about 4400 and the plurality of cooling tubes number at least about 38 with each cooling tube having one or more fins extending from an outer surface of the cooling tube.

29. A bushing assembly comprising a bushing comprising an orifice plate or tip plate having a length dimension L, and a width dimension W of at least about 4 inches, the L:W ratio being at least about 2, the bushing also comprising at least one wall and at least one pair of terminal ears, a tip plate having a plurality of spaced apart tips, the tips having orifices therethrough from an inside surface of the tip plate to exposed ends of the tips, the bushing assembly also comprising a plurality of spaced apart cooling tubes located in close proximity to the exposed ends of the tips for containing a flow of cooling fluid in each cooling tube, the cooling fluid entering one end of each cooling tube and exiting an opposite end of each cooling tube, wherein the plurality of spaced apart cooling tubes are oriented to be substantially parallel with the width dimension of the tip plate and the bushing and with rows of the tips and wherein the total number of tips on the tip plate is about 6000 and the plurality of cooling tubes number at least about 48 with each cooling tube having one or more fins extending from an outer surface of the cooling tube.

\* \* \* \* \*